June 7, 1949. G. PRODROMOS ET AL 2,472,617
TRIMMER
Filed Oct. 7, 1946 2 Sheets-Sheet 1
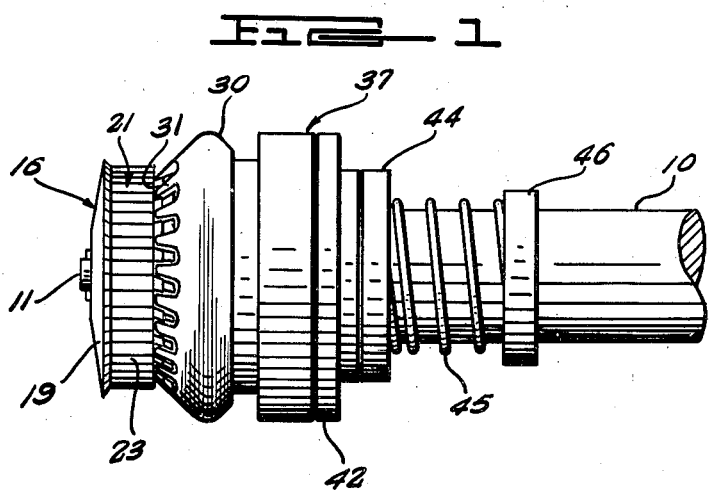
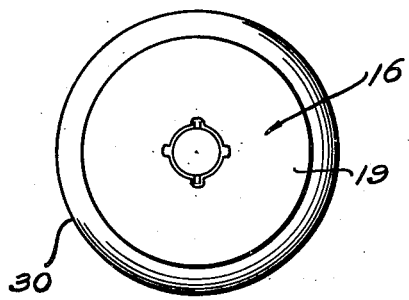
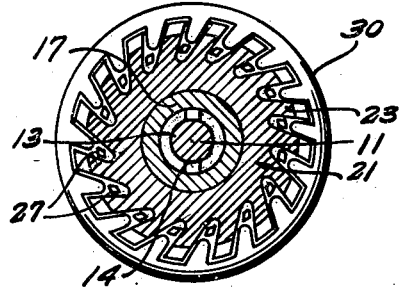
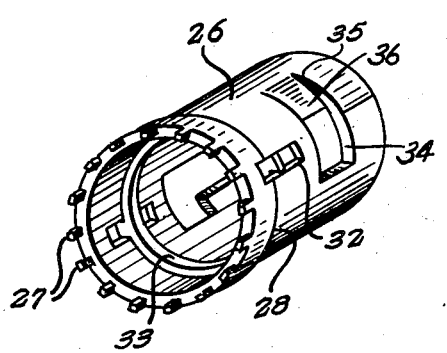
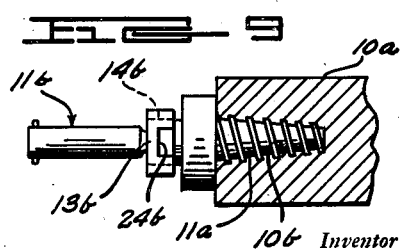
Inventor
GEORGE PRODROMOS
MARCUS PRODROMOS
By
Clarence A. O'Brien
and Harvey B. Jacobson
Attorneys

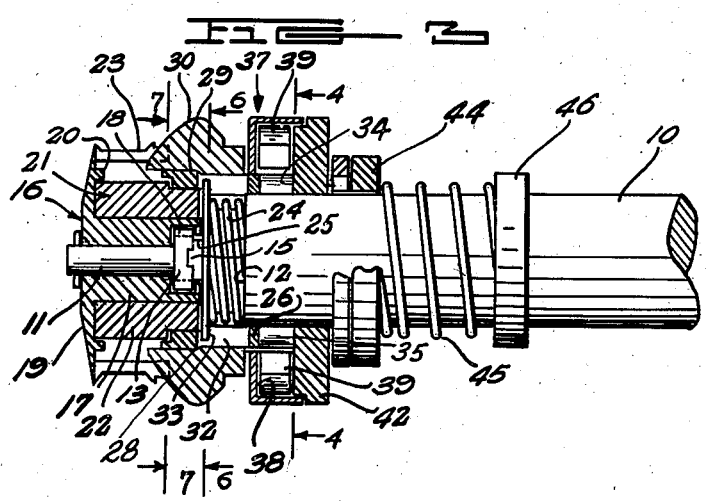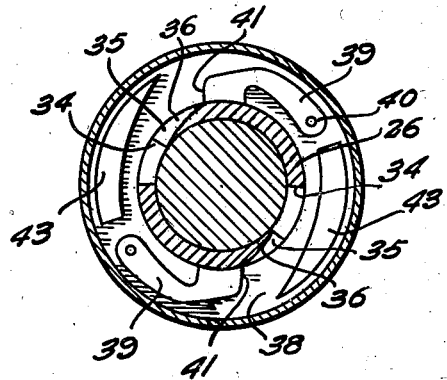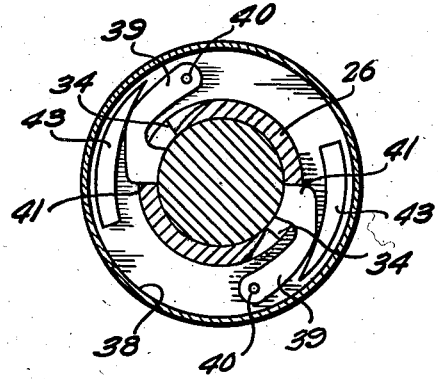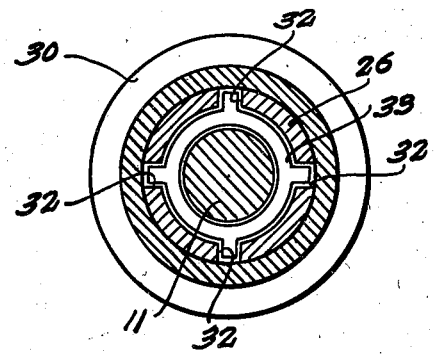

Patented June 7, 1949

2,472,617

UNITED STATES PATENT OFFICE 2,472,617

TRIMMER

George Prodromos and Marcus Prodromos,
Winston Salem, N. C.

Application October 7, 1946, Serial No. 701,726

7 Claims. (Cl. 12—88)

This invention relates to a sole and edge trimmer for shoes and the object of the invention is to enable the cutters to be easily and quickly removed.

Another object is to reduce to a minimum the hazards ordinarily encountered in the trimming of shoe soles.

A still further object is to establish driving connection between the guard and the trimmers so that should the guard be insecurely connected to the trimmer drive shaft, no driving power would be transmitted to the cutters.

Among its features my invention embodies an axial spindle at one end of the drive shaft of a shoe machine, said spindle forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses in the stop collar to establish driving connection between the shaft and the cutter guard, an outwardly extending guard flange on the end of the cutter guard opposite the recess, yielding means surrounding the spindle and abutting the shoulder for urging the lugs in the cutter guard into the recesses in the stop collar, a radially toothed cutter surrounding the cutter guard between the guard flange and the yielding means and an annular row of radially spaced lugs on the guard flange for entering the spaces between the teeth on the cutter and effecting driving connection between the cutter and the cutter guard.

Other features include a radially toothed secondary cutter surrounding the portion of the spindle between the stop collar and the shoulder and means yieldingly to hold the secondary cutter advanced toward the first mentioned cutter with the teeth of both cutters in meshing engagement.

Still other features include a sleeve slidably mounted on the shaft partially overhanging the spindle, an annular row of teeth on the overhanging end of the sleeve for meshing engagement with the teeth of the first mentioned cutter, the secondary cutter being mounted on the sleeve, an annular row of radially disposed cutting teeth on one end of the secondary cutter adapted to mesh with the teeth of the first mentioned cutter and means carried by the sleeve for engaging the yielding means to advance the sleeve and the secondary cutter longitudinally of the shaft and the teeth of the cutters into meshing engagement.

Still other features include means detachably connecting the secondary cutter with the sleeve.

In the drawings,

Figure 1 is a side view of a trimmer embodying the features of this invention,

Figure 2 is an end view of the trimmer illustrated in Figure 1,

Figure 3 is a longitudinal sectional view through the trimmer attachment,

Figure 4 is a transverse sectional view taken substantially along the line 4—4 of Figure 3, Figure 5 is a view similar to Figure 4 showing the parts in another position, Figure 6 is a transverse sectional view taken substantially along the line 6—6 of Figure 3, Figure 7 is a transverse sectional view taken substantially along the line 7—7 of Figure 3, Figure 8 is a perspective view of the sleeve upon which the secondary cutter is mounted, and Figure 9 is a fragmentary sectional view through a drive shaft illustrating a modified form of the invention.

Referring to the drawings in detail, a drive shaft 10 is provided at one end with an axial spindle 11 carrying, in spaced relation with the shoulder 12 formed at the junction of the spindle with the drive shaft 10, a stop collar 13 formed with diametrically opposite longitudinal grooves 14 and having in the wall which faces the shoulder diametrically opposite recesses 15 for a purpose to be more fully hereinafter explained.

Fitted over the spindle 11 is a cutter guard designated generally 16 which comprises a tubular guard body 17 formed at one end with an enlarged annular recess 18 for the reception of the stop collar 13 previously referred to. Extending outwardly from the end of the tubular body 17 opposite that containing the recess 18 is an annular guard flange 19 from the inner face of which, i. e. that facing the shoulder 12, project radially spaced lugs 20 the purpose of which will be more fully hereinafter explained. Projecting inwardly toward the axis of the tubular body 17 at its recessed end are diametrically opposed lugs 25.

A cutter designated generally 21 surrounds the tubular body 17 of the cutter guard 16 and comprises a tubular body 22 carrying radially spaced cutter teeth 23 of conventional form. As illustrated in Figure 3, the lugs 20 project into the spaces between the teeth 23 in order to establish driving connection between the cutter guard 15 and the cutter 21.

Surrounding the spindle 11 between the inner end of the cutter and the shoulder 12 is a compression coil spring 24 which is adapted to hold the cutter projected outwardly against the flange 19, and to hold the inwardly extending radially disposed lugs 25 in the recesses 15 in order to establish driving connection between the spindle 11 and the cutter guard 16.

Fitted over the end of the shaft 10 carrying the spindle 11 is a sleeve 26 provided at one end with an annular row of spaced teeth 27. A stop shoulder 28 is formed on the sleeve 26 adjacent the end carrying the teeth 27 and forms an abutment against which a shoulder 29 formed in the secondary cutter 30 is adapted to engage when the cutter is in position on the sleeve. As illustrated in Figure 1, the cutter 30 is provided at one end with a plurality of spaced cutter teeth 31 which are adapted to mesh with the cutter teeth 23 in order to effect driving connection between the cutters.

Mounted for longitudinal sliding movement within the sleeve 26, in circumferentially spaced longitudinally extending slots 32, is a stop ring 33 which as illustrated in Figure 3 is disposed between the end of the spring 24 and the inner ends of the cutter guard 16 and the cutter 21 to hold the spring in place when the cutter and cutter guard are removed from the spindle 11.

Opening into the end of the sleeve 26 opposite that carrying the teeth 27 are diametrically opposite openings 34 provided with perpendicular circumferential grooves 35 the bottom walls of which form cam surfaces 36 for a purpose to be more fully hereinafter explained. A stop collar 37 is fitted over the slotted end of the sleeve 26 for engagement with the cutter 30 to hold the latter against the stop 28 and formed in the stop collar 37 is an annular recess or chamber 38 in which latch-dogs 39 are operable. As illustrated in Figure 4, these latch-dogs are pivoted as at 40 to the stop collar 37 to swing about axes parallel with the longitudinal axis of the sleeve 26 and carry at their free ends inwardly projecting tongues 41 of a width easily to be received in the openings 34. A cam ring 42 is rotatably supported in the recess 38, and fixed to the face of the cam ring 42 facing the latch-dogs 39 are cams 43, which in one position of the ring 42 are adapted to project the ends 41 of the latch-dogs 39 through the openings 34 as illustrated in Figure 5, and in another position are adapted to permit the latch-dogs to ride the cam faces 36 of the grooves 35 onto the outer surface of the sleeve 26 as illustrated in Figure 4. It will thus be seen that with the parts in this position the stop collar 37 will be free to move longitudinally of the sleeve 26 in order to permit the cutter 30 to be removed therefrom. When the tongues 41 are projected into the openings 34, however, the stop collar will be held against longitudinal movement on the sleeve 26.

In the modified form of device illustrated in Figure 9, the drive shaft 10a is equipped with an internally screw-threaded axial bore 10b and a spindle designated generally 11b is provided like the spindle 11 with a stop collar 13b having diametrically spaced notches 24b intermediate which are located longitudinally extending diametrically opposed peripheral grooves 14b. Formed on the end of the spindle 11b is a threaded extension 11a which is adapted to be threaded into the threaded bore 10b of the shaft 10a as illustrated in the drawings.

Surrounding the shaft 10 adjacent the stop collar 37 and in abutting relation with the sleeve 26 is a longitudinally slidable collar 44 urged by a spring 45 into engagement with the sleeve, and fixed to the shaft in spaced relation to the shoulder 12 is a stop collar 46 against which the spring 45 abuts as will be readily understood upon reference to the drawings.

In use, it will be understood that the cutter 21 is first slipped over the cylindrical portion 17 of the cutter guard 16 with the spring 24 in place over the spindle 11. The cutter guard is then slipped over the free end of the spindle with the lugs 25 passing through the slots 14 in the stop collar 13 and the lugs 27 on the sleeve 26 entering the spaces between the teeth of the cutter positively to establish driving connection between the cutter and the sleeve. Such movement compresses the spring 24 against the shoulder 12 and upon rotating the cutter guard 16 it will be obvious that the lugs 25 will be engaged in the recesses 15 of the collar 13 in order to effect driving connection between the shaft and the cutter guard. The bosses 20 projecting between the teeth 23 of the cutter 21 will establish driving connection between the cutter and the cutter guard so that the cutter will rotate in unison with the shaft 10. The pressure of the spring 24 against the end of the cutter guard and cutter will hold the parts in driving relation until such time as it is necessary to replace the cutter, when pressure is applied on the outer end of the cutter guard 16 to force the lugs 25 out of the recesses 24, and upon rotating the cutter guard and cutter it will be obvious that the lugs 25 may be made to align with the slots 14 in the stop collar 13 so as to permit the cutter guard and cutter to be removed from the end of the spindle. Obviously, with the removal of the cutter 21 and cutter guard 16, the sleeve 26 and the cutter 30 will be free to be slipped off of the end of the shaft 10 over the spindle 11. In order to change the cutter 30 it is necessary to rotate the cam ring 42 to move the cams 43 away from the dogs 39 and then to rotate the stop collar 37 to cause the dogs 39 to ride up the inclined faces 36 of the grooves 35. With the parts in this position the stop collar 37 may be slipped off of the end of the sleeve 26 to free the cutter 30. A new and sharpened cutter may then be replaced and the stop collar 37 positioned on the sleeve adjacent the cutter 30 and pushed home, rotating to align the tongues 41 with the openings 34 and locked by rotation of the cam ring 42 to cause the tongues 41 of the dogs 39 to reenter the openings 34 and the sleeve and fresh cutter are then ready for replacement on the shaft 10.

While in the foregoing there has been shown and described the preferred embodiment of this invention it is to be understood that minor changes in the details of construction, combination and arrangement of parts may be resorted to without departing from the spirit and scope of the invention as claimed.

We claim:

1. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means and an annular row of circumferentially spaced lugs on the guard flange for entering the spaces between the teeth on the cutter and effecting driving connection between the cutter and the cutter guard.

2. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange, the yielding means and an annular row of circumferentially spaced lugs on the guard flange for entering the spaces between the teeth on the cutter and effecting driving connection between the cutter and the cutter guard, a radially toothed secondary cutter surrounding the portion of the spindle between the stop collar and the shoulder and means yieldingly to hold the secondary cutter advanced toward the first mentioned cutter with the teeth of both cutters in meshing engagement.

3. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means, an annular row of circumferentially spaced lugs on the guard flange for entering the spaces between the teeth on the cutter and effecting driving connection between the cutter and the cutter guard, a sleeve slidably mounted on the shaft partially to overhang the spindle, an annular row of teeth on the overhanging end of the sleeve for meshing engagement with the teeth of the first mentioned cutter, a secondary cutter mounted on the sleeve, an annular row of radially disposed cutting teeth on one end of the secondary cutter adapted to mesh with the teeth of the first mentioned cutter, means carried by the sleeve for engaging the yielding means to advance the sleeve and the secondary cutter longitudinally of the shaft and the teeth of the sleeve and the secondary cutter into meshing engagement with the teeth of the first mentioned cutter.

4. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means, an annular row of circumferentially spaced lugs on the guard flange for entering the spaces between the teeth on the cutter and effecting driving connection between the cutter and the cutter guard, a sleeve slidably mounted on the shaft partially to overhang the spindle, an annular row of teeth on the overhanging end of the sleeve for meshing engagement with the teeth of the first mentioned cutter, a secondary cutter mounted on the sleeve, an annular row of radially disposed cutting teeth on one end of the secondary cutter adapted to mesh with the teeth of the first mentioned cutter, means carried by the sleeve for engaging the yielding means to advance the sleeve and the secondary cutter longitudinally of the shaft and the teeth of the sleeve and the secondary cutter into meshing engagement with the teeth of the first mentioned cutter, and a stop at the toothed end of the sleeve to limit the advance of the secondary cutter toward the toothed end of the sleeve.

5. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means, an annular row of circumferentially spaced lugs on the guard flange for entering the spaces between the teeth on the cutter and effecting driving connection between the cutter and the cutter guard, a sleeve slidably mounted on the shaft partially to overhang the spindle, an annular row of teeth on the overhanging end of the sleeve for meshing engagement with the teeth of the first mentioned cutter, a secondary cutter mounted on the sleeve, an annular row of radially disposed cutting teeth on one end of the secondary cutter adapted to mesh with the teeth of the first mentioned cutter, means carried by the sleeve for engaging the yielding means to advance the sleeve and the secondary cutter longitudinally of the shaft and the teeth of the sleeve and the secondary cutter into meshing engagement with the teeth of the first mentioned cutter, a stop at the toothed end of the sleeve to limit the advance of the secondary cutter toward the toothed end of the sleeve, and means carried by the sleeve to hold the secondary cutter advanced toward the stop.

6. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means, an annular row of circumferentially spaced lugs on the guard flange for entering the spaces between the teeth on the cutter and effecting driving connection between the cutter and the cutter guard, a sleeve slidably mounted on the shaft partially to overhang the spindle, an annular row of teeth on the overhanging end of the sleeve for meshing engagement with the teeth of the first mentioned cutter, a secondary cutter mounted on the sleeve, an annular row of radially disposed cutting teeth on one end of the secondary cutter adapted to mesh with the teeth of the first mentioned cutter, means carried by the sleeve for engaging the yielding means to advance the sleeve and the secondary cutter longitudinally of the shaft and the teeth of the sleeve and the secondary cutter into meshing engagement with the teeth of the first mentioned cutter, a stop at the toothed end of the sleeve to limit the advance of the secondary cutter toward the toothed end of the sleeve, and a stop collar detachably connected with the sleeve to hold the secondary cutter against the stop.

7. A trimmer comprising a shaft, an axial spindle on one end of the shaft forming an annular shoulder at its junction with the shaft, a stop collar fixed to the spindle in spaced relation to the shoulder, said stop collar having diametrically opposite longitudinal grooves in its periphery and diametrically opposite recesses in its end facing the shoulder, a cutter guard surrounding the spindle and having an enlarged stop collar receiving recess in one end, diametrically opposed lugs extending inwardly from the recessed end of the cutter guard for passage through the grooves and entrance into the recesses to establish driving connection between the shaft and the cutter guard, an outwardly extending annular guard flange on the end of the cutter guard opposite the recess, yielding means surrounding the spindle and abutting the shoulder for urging the lugs on the cutter guard into the recesses in the stop collar, a radially toothed cutter surrounding the cutter guard between the guard flange and the yielding means, an annular row of circumferentially spaced lugs on the guard flange for entering the spaces between the teeth on the cutter and effecting driving connection between the cutter and the cutter guard, a sleeve slidably mounted on the shaft partially to overhang the spindle, an annular row of teeth on the overhanging end of the sleeve for meshing engagement with the teeth of the first mentioned cutter, a secondary cutter mounted on the sleeve, an annular row of radially disposed cutting teeth on one end of the secondary cutter adapted to mesh with the teeth of the first mentioned cutter, means carried by the sleeve for engaging the yielding means to advance the sleeve and the secondary cutter longitudinally of the shaft and the teeth of the sleeve and the secondary cutter into meshing engagement with the teeth of the first mentioned cutter, a stop at the toothed end of the sleeve to limit the advance of the secondary cutter toward the toothed end of the sleeve, said sleeve having a pair of diametrically opposed slots opening thereinto, a cam groove in the periphery of the sleeve at the inner end of each slot, a stop collar adapted to be fitted over the sleeve to engage the secondary cutter and hold it advanced against the stop and dogs carried by the stop collar for entrance into the slots and engagement with the cam grooves to lock the stop collar against the secondary cutter.

GEORGE PRODROMOS.
MARCUS PRODROMOS.

No references cited.